July 1, 1969

M. J. CRUMPEN 3,453,631

SLOTTED WAVEGUIDE AERIAL SYSTEMS HAVING SELECTABLE
DIRECTIONS OF RADIATION

Filed July 27, 1966

INVENTOR
Mervyn James Crumpen
BY
Baldwin, Wight, Diller & Brown
ATTORNEYS

United States Patent Office 3,453,631
Patented July 1, 1969

3,453,631
SLOTTED WAVEGUIDE AERIAL SYSTEMS HAVING SELECTABLE DIRECTIONS OF RADIATION
Mervyn James Crumpen, Essex, England, assignor to The Marconi Company Limited, London, England, a British company
Filed July 27, 1966, Ser. No. 568,164
Claims priority, application Great Britain, Aug. 16, 1965, 34,958/65
Int. Cl. H01q 13/10
U.S. Cl. 343—768                3 Claims

ABSTRACT OF THE DISCLOSURE

A slotted wave-guide aerial comprises a length of wave-guide with a phase shifter at the intermediate point thereof and with two sets of slots, one on each side of the phase shifter. When the guide is fed from one end the two slots have one common principal radiation direction and, when fed from the other end the two slots have a different common principal radiation direction.

---

This invention relates to aerial systems and more specifically to aerial systems of the slotted wave-guide type. Such aerial systems are of wide application, one of the most important applications being to air-borne Doppler navigational equipment. In certain applications of slotted wave-guide aerials the aerials are required to be fed at different ends at different times in order to change over the principal radiation direction (the direction of the main lobe in the polar radiation diagram) from one direction to another. This is commonly done in airborne Doppler navigation equipments as above mentioned. It is very desirable that when the feed is changed over from one end to the other the radiation and reception characteristics (other of course than the principal direction) shall be, as far as possible unchanged. This requirement is, in practice, difficult to satisfy because of constructional asymmetry. When the aerial is fed at one end of the slots have one direction of inclination as viewed from that end but this is not the same as the direction of inclination as viewed from the other. If therefore there is some other body—and there usually is—in the close field of the aerial, its effects on the radiation and reception characteristics will not be the same when the aerial is fed from one end as they are when it is fed from the other. This is particularly troublesome when, as is customary in the Doppler navigation equipments referred to, the slotted wave-guide aerials are mounted in beam concentrating metal hoods, for these hoods are quite close to the aerials and extend over their whole lengths.

The object of the present invention is to provide improved slotted wave-guide aerials which can be fed at will at either end without introducing at least to any material extent, the defects of asymmetry above mentioned.

According to this invention a slotted wave-guide aerial comprises on each side of an intermediate point in the length thereof, at set of parallel slots, the slots of one set being differently arranged from those of the other and a phase shifter being interposed in the guide between the two sets, the phase shift of said phase shifter and the different arrangements of the two sets being such that, when the guide is fed from one end the two sets have one common principal radiation direction, while when the guide is fed from the other end the two sets have a different common principal radiation direction.

Preferably the phase shifter provides 180° phase shift.

A preferred embodiment of the invention comprises a length of rectangularly sectioned wave-guide with a phase shifter inserted at the intermediate point and two sets of slots, one set at each side of the phase shifter, in one narrow wall of the guide, the slots in one set being oppositely inclined with respect to, and mirror images of the slots of the other set.

In accordance with normal practice the unfed end of the wave-guide is loaded by a matching load e.g. a resistance or a diode acting as a short circuit. An aerial in accordance with this invention may be used with great advantage in an airborne Doppler navigation equipment, the aerial being mounted in a hood and switching means being provided for changing over at will the end which is fed with the end which is loaded.

The phase shifter may take any of a variety of forms known per se. For example it may be constituted by an insulating block, i.e. a silicon-bonded fibreglass block occupying the waveguide section for the correct length to provide the required phase shift.

The invention is illustrated in and further explained in connection with the accompanying drawings in which.

The aerial arrangements shown are of course useful for transmitting and for receiving but, to simplify description, only transmission will be dealt with in what follows.

Figure 1:
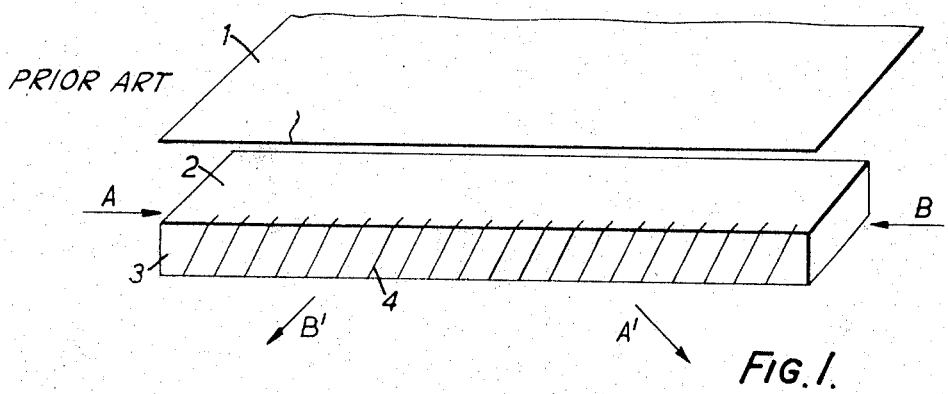
FIGURE 1 is a diagrammatic perspective view provided for purposes of explanation of a known arrangement.

FIGURE 1 shows a known slotted wave-guide aerial arrangement which will produce a principal direction of transmission in either of two directions A' or B' according to whether the guide is fed at one end A or the other B. The guide 2 has parallel inclined slots 4 cut in one of its narrow walls, 3. 1 is part of a metal hood in which the slotted guide is mounted e.g. when the aerial is used in an airborne Doppler navigation equipment. As will be seen this hood is in the close field of the aerial and will modify the propagation constants thereof. Clearly the modification will not be the same when the guide is fed at one end as it is when the guide is fed from the other because in the two directions of feed the slots present different effective phase configurations as viewed from the hood. This asymmetry is almost always undesirable and may be seriously objectionable in some cases. Thus, in particular, when the aerial is used in a Doppler navigation aid, the asymmetry will cause so-called frequency error in the Doppler equipment. This normally manifests itself in an airborne Doppler equipment in an erroneous indication of aircraft drift.

Figure 2:
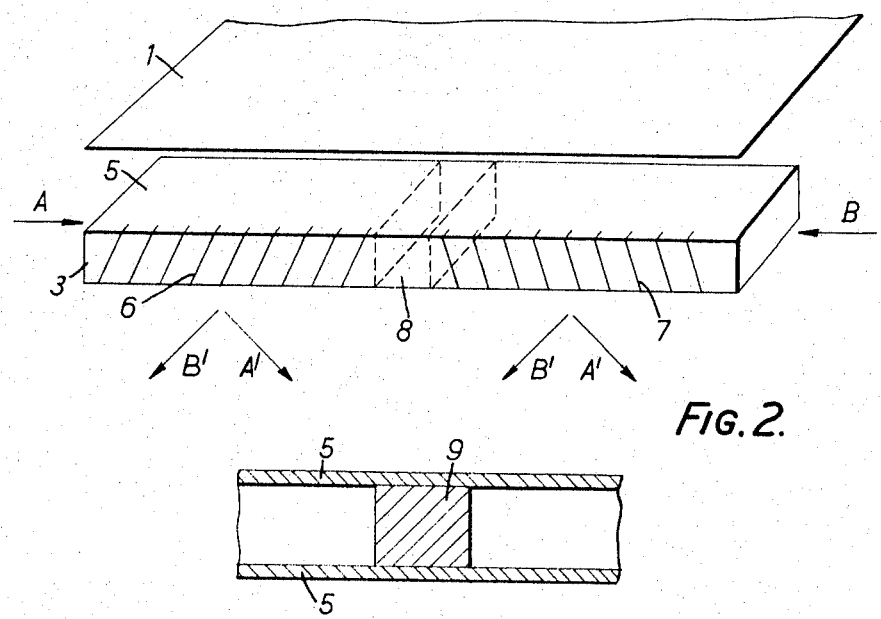
FIGURE 2 is a similar view of an embodiment of this invention.

The embodiment of the invention shown in FIGURE 2 comprises, in a hood partly shown at 1, a waveguide 5 having two sets 6 and 7 of slots one each side of the middle of the length of the guide. The slots of one set are oppositely inclined with respect to and are mirror images of the slots of the other set. Thus there is a symmetrical arrangement of slots as seen from the hood 1 whether the guide is fed from end A or end B. The slots 6 are phased at 180° to the slots 7 and therefore a 180° phase-shifter 8 is provided in the guide between the two sets.

Feeding the waveguide at A gives rise to one principal direction of transmission while feeding the waveguide at B gives rise to a different principal direction of transmission. Each of these principal directions is, as indicated by the arrows, a common direction for both sets of slots, the arrows A' applying to the case where the end A is fed and the arrows B' applying to the case where the end B is fed.

Figure 3:
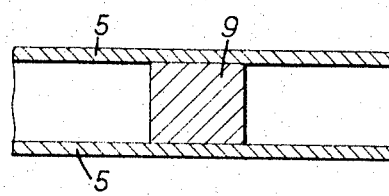
FIGURE 3 is a diagrammatic view of one possible form of phase-shifter for use in carrying out the invention.

An example of a phase-shifter suitable for use at 9 is shown in FIGURE 3. Both FIGURES 2 and 3 are cross-sectional views of the wave-guide along its longitudinal axis. In FIGURE 3 the broad walls of the guide are referenced 5. A silicon-bonded fibreglass block 9 occupies the section of the waveguide and provides the required phase-shift.

The invention is obviously not limited to the arrangements illustrated in FIGURES 2 and 3 nor to aerials for use in airborne Doppler navigation equipments. Thus, for example, the invention may be applied to waveguide aerials with slots in a broad wall (instead of a narrow wall) and to slotted waveguide aerials of square or circular section.

Two aerials in accordance with this invention, one with in-phase slotting and the other with anti-phase slotting, and fed at opposite ends may be used side by side in order to obtain, in accordance with known principles, substantial freedom of dependence of direction upon reasonable variations of frequency and/or temperature. Two such aerials may be in a common hood.

In all cases the unfed end of the aerial is suitably loaded (loading means are not shown in the drawings) in accordance with practice known per se.

I claim:

1. A slotted wave-guide aerial comprising on each side of an intermediate point in the length thereof, a set of parallel slots, the slots of one set being differently arranged from those of the other and a phase shifter being interposed in the guide between the two sets, the phase shift of said phase shifter and the different arrangements of the two sets being such that, when the guide is fed from one end the two sets have one common principal radiation direction, while when the guide is fed from the other end the two sets have a different common principal radiation direction.

2. An aerial as claimed in claim 1 wherein the phase shifter provides 180° phase shift.

3. An aerial as claimed in claim 1 in which said wave guide is rectangularly sectioned, said sets of slots being in one narrow wall of the guide, the slots in one set being oppositely inclined with respect to, and mirror images of the slots of the other set.

References Cited

UNITED STATES PATENTS 3,328,800    6/1967    Algeo _____ 343—768

HERMAN KARL SAALBACH, *Primary Examiner.*

MARVIN NUSSBAUM, *Assistant Examiner.*

U.S. Cl. X.R.

343—771